Sept. 10, 1968          K. K. KESLING          3,400,780
AIR CUSHION LOAD SUPPORTING DEVICE
Filed Feb. 1, 1966          2 Sheets—Sheet 1
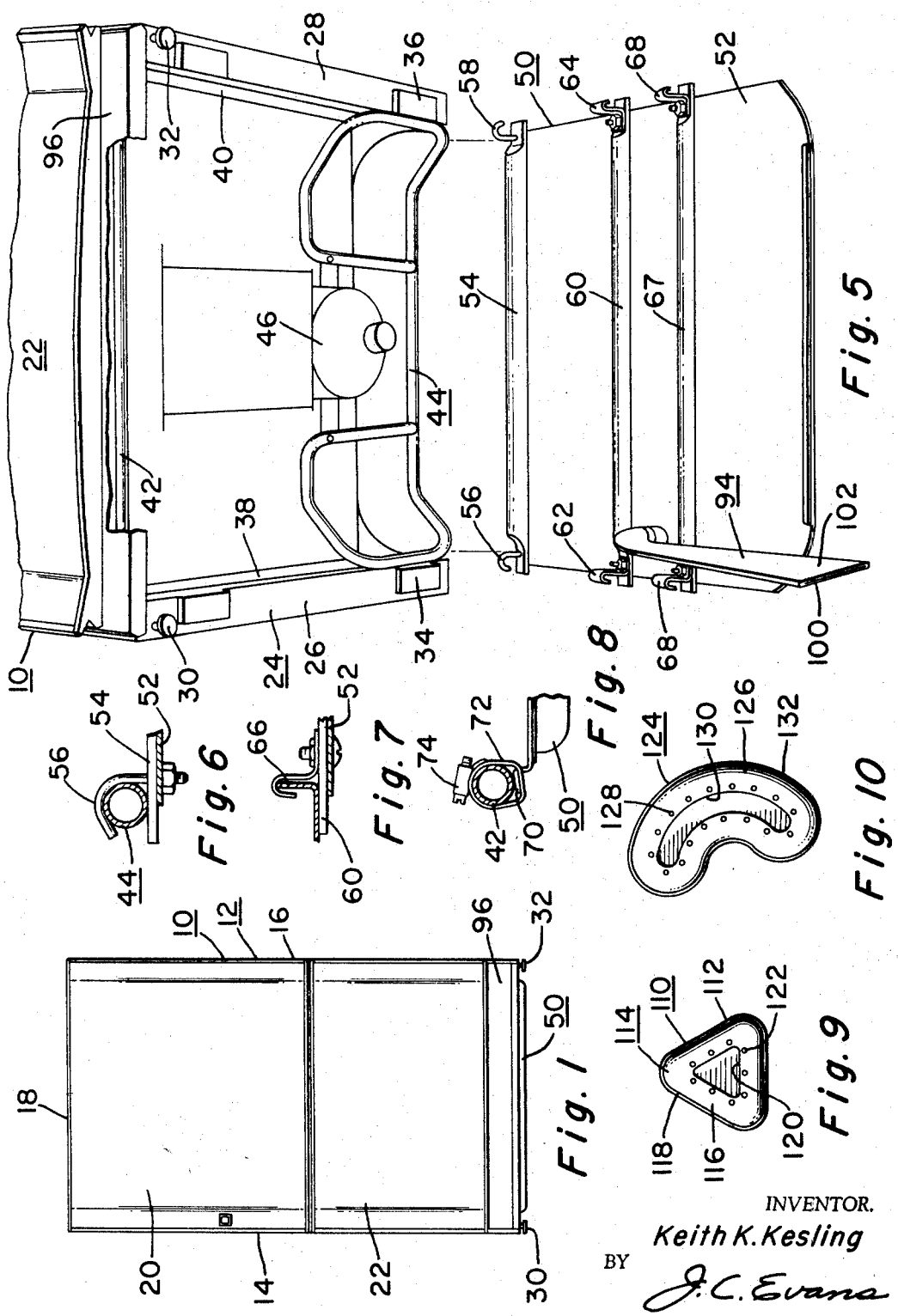
INVENTOR.
Keith K. Kesling
BY
J. C. Evans
His Attorney

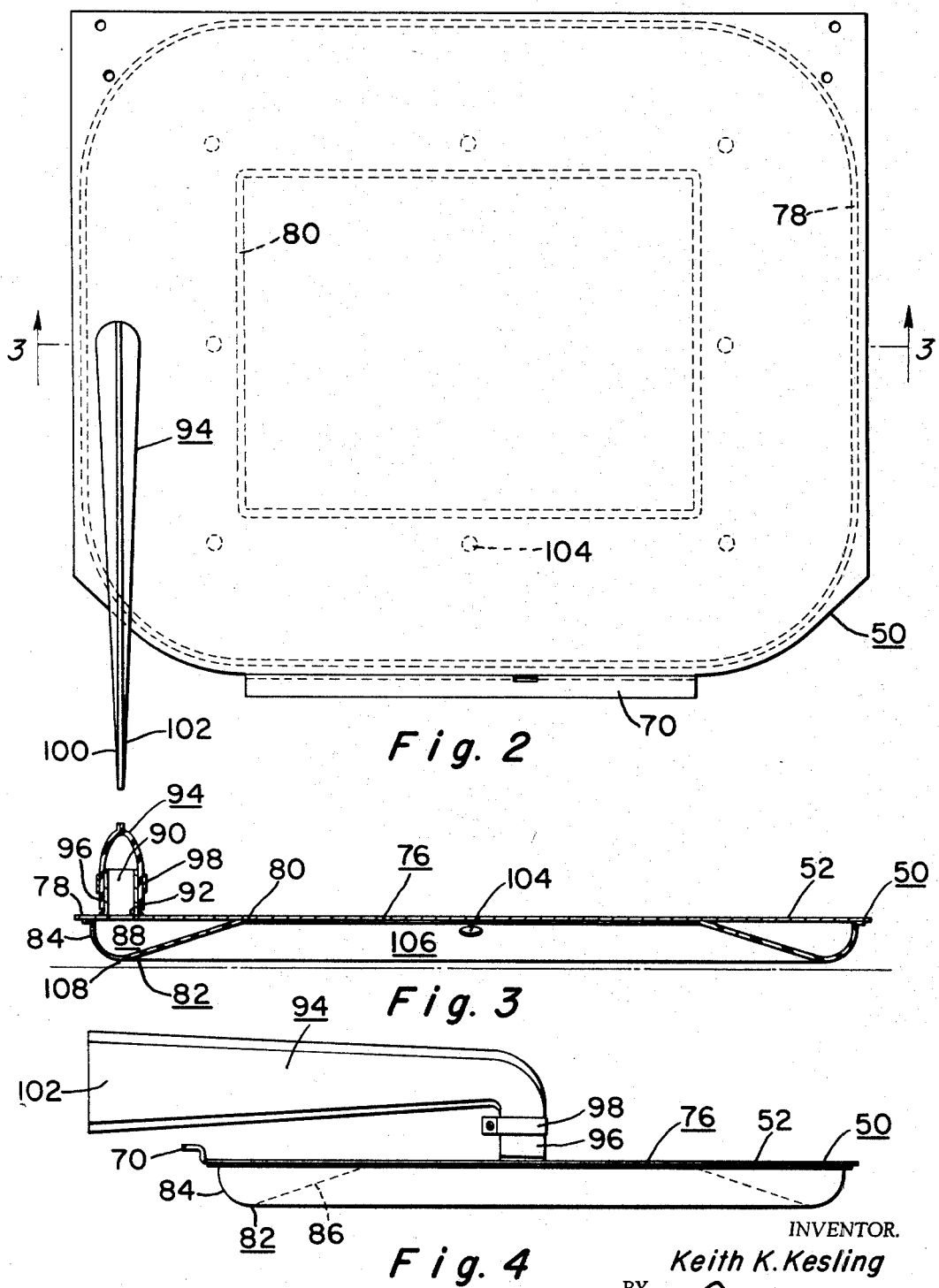

United States Patent Office 3,400,780
Patented Sept. 10, 1968

3,400,780
AIR CUSHION LOAD SUPPORTING DEVICE
Keith K. Kesling, Dayton, Ohio, assignor to General Motors Corporation, Detroit, Mich., a corporation of Delaware
Filed Feb. 1, 1966, Ser. No. 524,011
5 Claims. (Cl. 180—124)

ABSTRACT OF THE DISCLOSURE

In preferred form, an air load combination including a load having a base with a predetermined shape, an air cushion device on the base including a rigid plate connected to and congruous with the base, a flexible diaphragm below the rigid plate having outer and inner peripheral edges connected to the plate, a shallow convolution in the diaphragm connecting the edges thereof and defining an inflatable chamber of annular form located immediately below and continuously around the peripheral edge of both the plate and the load base, the convolution being held by the peripheral edges against lateral movement with respect to the plate to maintain a stable inflated air cushion plenum within the convolution in part defined by a planar extent on the rigid plate having an area substantially congruous with the planar area of the plenum chamber itself.

---

This invention relates to air cushion load supporting devices and more particularly to air cushion devices of the type including a low-profile, flexible diaphragm for forming an air pressurized cushion beneath a supported load.

In the development of air cushion load supporting devices, one problem has been to maintain a stable platform for moving loads characterized by having a load receiving surface on which forces are normally placed above the center of gravity of the load to produce substantial tipping moments on the load. In order to reduce the amount of air required to lift a predetermined load, and to obtain a predetermined amount of stability in air cushion load supporting devices, units of the type disclosed in United States Patent No. 3,161,247, issued Dec. 15, 1964, to Mackie, have been developed.

These units, while having desirable load supporting characteristics, are characterized by the provision therein of a low-profile inflatable, flexible diaphragm that has uniform dimensional characteristics. Thus, the effective air lift action of the air cushion in such units is offset inwardly of the outer periphery of many loads supported thereon and where the load has substantial tipping moments directed thereagainst in the normal course of its use, it has been found that there is a tendency for the air cushion forming flexible diaphragm to bottom out against a supporting floor in an undesirable fashion.

Accordingly, an object of the present invention is to improve the stability of air cushion load supporting devices of the type including a low-profile, inflatable, flexible diaphragm to form an air lift cushion beneath the load by the provision of an irregularly-shaped load carrying member having a diaphragm depending therefrom and including a shallow convolution therein formed continuously about the outer periphery of the diaphragm and located to underlie the outer periphery of the irregularly-shaped load carrying member.

A further object of the present invention is to improve air cushion devices of the type including a low-profile, flexible, pressurizable diaphragm defining a plenum in which is formed a load supporting air cushion by the provision of an irregularly formed load supporting member adapted to be matched to the base of a load having substantial tipping moments directed thereagainst during the normal use of the load supporting device and wherein a flexible diaphragm depends from the irregular load supporting member which has a shallow convolution formed continuously about the periphery thereof underlying the outer periphery of the irregularly-shaped load supporting member to spread the air cushion effect of the device throughout substantially the full planar extent of the load supported thereon whereby an air cushion action is present to counteract the tipping moments applied on the load.

Still another object of the present invention is to improve air cushion load supporting devices of the type including a low-profile inflatable, flexible diaphragm for forming a plenum to produce an air cushion under a supported load by the provision of an irregularly-shaped load carrying member having a depending, flexible diaphragm thereon with a low-profile convolution formed continuously about the outer periphery of the diaphragm and wherein the convolution has a peripheral edge thereon having substantially the same shape and dimensions as the outer perimeter of an irregularly formed load supporting member and an inner peripheral edge located inwardly of the outer periphery in close spaced relationship with the outer edge and wherein both the edges are heat sealed to the backing plate to form an irregularly-shaped, continuous pressurizable cavity in the diaphragm at the convolution therein which bounds a space beneath the load supporting member having an effective planar area spread substantially completely across the full planar extent of the base of the supported load.

Further objects and advantages of the present invention will be apparent from the following description, reference being had to the accompanying drawings wherein preferred embodiments of the present invention are clearly shown.

In the drawings:

FIGURE 1 is a view in front elevation of a vertical refrigerator cabinet including the present invention;

FIGURE 2 is a view in top elevation of an improved air cushion device in the present invention;

FIGURE 3 is a view in vertical section taken along the line 3—3 of FIGURE 2;

FIGURE 4 is a view in side elevation of the present invention;

FIGURE 5 is an exploded perspective view of the invention shown in association with the base of the refrigerator in FIGURE 1;

FIGURE 6 is an enlarged view in vertical section of one fastening detail in the assembly of FIGURE 5;

FIGURE 7 is an enlarged view in vertical section of another fastening detail;

FIGURE 8 is an enlarged vertical, sectional view of another fastening detail;

FIGURE 9 is a view in bottom plan of another embodiment of the invention; and

FIGURE 10 is a view in bottom plan of still another embodiment of the present invention.

Referring now to the embodiment of FIGURES 1 through 8, a vertical combination refrigerator, freezer 10 is illustrated that includes an outer casing 12 having side walls 14, 16, a top 18 and a rear wall (not shown). The outer casing 12 has a front access opening to a food storage compartment and a front access opening to a freezer compartment, respectively, closed by vertically hinged doors 20, 22. The refrigerator 10 also includes a reinforced base 24 thereon which includes sheet metal side rails 26, 28 having adjustable floor engaging legs 30, 32 secured thereto adjacent the front thereof. Embossed portions 34, 36 support the rear portion of the base 24 of the refrigerator on a supporting floor. Additionally, the base 24 includes reinforcing tubes 38, 40 on either side thereof which are joined at their front ends by a cross member 42 and at their rear extremities by a tubular frame 44 that supportingly receives a compressor 46 that is associated operatively in serial refrigerant flow relationship with a condenser expansion device, such as a capillary tube, and an evaporator to provide cooling of the food storage and freezing compartments of the refrigerator 10.

The illustrated refrigerator is representative of a relatively heavy load that is located normally in a stationary position and relatively difficult to move from such a stationary position. Moreover, refrigerators, in particular, often are located in alcoves or other built-in cabinet combinations whereby it is difficult to apply an adequate force thereon to move the refrigerator so that the supporting floor under the refrigerator can be readily accessible for cleaning.

Another characteristic of the illustrated refrigerator or a like supported load is that there is a substantial surface thereon located above the center of gravity of the refrigerator which in the illustrated arrangement occurs even when the cabinet is loaded at a point below the break line between the door 20 and the door 22. As a result, forces to move the refrigerator 10 normally are applied above the center of gravity so as to produce substantial tipping moments on the refrigerator 10.

As a result, floor engaging members such as the adjustable legs 30, 32, in addition to producing a substantial frictional resistance against movement, can be forced into the supporting floor to damage the surface thereon, for example, a vinyl or linoleum type covering.

It has been proposed that refrigerators and like vertically disposed loads be associated with air cushion devices to produce an air lifting effect on the base of the load to raise it out of frictional contact with a supporting floor whereby the load can be relatively easily moved with respect thereto.

One premise in the design of air cushion devices has been that a uniform dimenisonal configuration is required to effect a stable platform or air cushion to support loads. It has also been found that a certain degree of load supporting stability is possible by using an air cushion device of the type set forth in the above-mentioned Mackie patent wherein the air cushion is confined by an inflatable, uniformly dimensioned, flexible diaphragm which is characterized by having a low profile. Such units are suitable for association with most loads in that they occupy a relatively limited height and are readily slidably or positionable under the base of most loads to be related operatively to such loads so that the air lift produced by the air cushion will act on the loads to raise them out of friction engaging contact with the supporting floor.

While prior air cushion devices having such uniform dimensional and low-profile characteristics are suited to carry a wide range of supported loads, it has been found that at times they are somewhat unstable when the load has a large tipping moment applied thereon. In such arrangements, it will be noted that the air cushion at certain points is located inwardly of the outer edge of a load supporting member a substantial distance and as a result, when diagonally directed tipping moments are applied on the load, there will be a tendency for such moments to overcome the air cushion effect whereby the air cushion device will bottom out against the supporting floor and thereby nullify the desired friction reducing characteristics of a device of this type.

Accordingly, the refrigerator 10 in the illustrated arrangement which is a type of a load having substantial tipping moments applied thereon during movement of the load includes an improved air cushion supporting device 50 connected to the base 24 to overcome or substantially reduce the tendency for such bottoming out. More particularly, the improved air cushion load supporting device 50 includes an irregularly-shaped rigid plate 52 that underlies substantially the full planar extent of the base 24 of the refrigerator 10. The irregular shape referred to is intended to include forms other than generally circular configurations of the type set forth in the aforementioned Mackie patent, namely forms that have a shape other than a uniform radius as disclosed in the Mackie arrangement.

The rigid plate 52 in the illustrated arrangement has a reinforcing rod 54 secured across the rear edge thereof which includes hook members 56, 58 on either end thereof that are fastened through the ends of the rod 54 and the plate 52 and hooked about portions of the frame 44, as shown in FIGURE 6, to carry this portion of the plate 52 on the base 24 of the refrigerator 10. Additionally, a second rod 60 extends across an intermediate portion of the plate 52 and includes spring clip members 62, 64 on either end thereof that are fastened to the plate 52 and the ends of the rod 60 and fastened about an upwardly turned flange portion 66 on each of the sides 26, 28 of the base 24.

In the representatively illustrated arrangement, to provide a predetermined reinforcing of the rigid backing plate 52, another transverse rod 67 is directed across the width of the plate 52 and includes a spring clip 68 on either end thereof like clips 62, 64, previously described, that also fasten on the flange 66 of the side members 26, 28.

The front edge of the plate 52 has an outwardly directed raised extension 70 across the width thereof through which is directed a plurality of straps 72 that are looped about the reinforcing rod 42, as best seen in FIGURE 8, and secured thereto by suitable screw fastener means 74.

The rigid plate 52 has a depending diaphragm 76 of flexible material such as polyethylene depending therefrom and includes an outer peripheral edge heat bonded at 78 completely around the irregularly-shaped backing plate 52 at the outer periphery thereof. The diaphragm 76 further includes an inwardly located edge bonded at 80 a closely-spaced distance inwardly of the edge 78 throughout the extent of the outer edge 78. In the illustrated arrangement, the diaphragm between the edge 80 is coextensive and in juxtaposition with the plate 52, as best illustrated in FIGURE 3. Between the edge portions 78 and 80 a shallow convolution 82 is preformed in the diaphragm 76 and includes a segment 84 having a first predetermined radius that is joined at a point of tangency to an annular segment 86 of a truncated cone shape to form a pressurizable continuously formed cavity 88 that underlies the outer peripheral portion of the rigid plate 52.

In the illustrated arrangement, an inlet fitting 90 is secured to the plate 52 about an opening 92 that communicates with the pressurizable cavity 88 and an elongated supply tube 94 has a tubular end portion 96 thereon secured by a clamp ring 98 to the inlet fitting 90. The supply tube 94 is directed from the inlet fitting above and across the plate 52 to a location readily accessible when a scuff plate 96 on the front of the cabinet 12 is removed therefrom. The inlet tube 94 essentially includes a pair of spaced apart side walls 100, 102 that are tapered from the extremity thereof to the tubular portion 96 of the tube so as to form an adapter into which a tubular member can be inserted through which pressurized air can be directed to the pressurizable chamber 88. The insertable tube, for example, can be a vacuum cleaner attachment which is connected to a pressurized outlet of a vacuum cleaner so as to discharge pressurized air into the cavity 88.

The continuous segment 86 has a plurality of small diameter openings 104 therein which communicate the pressurizable cavity 88 with a plenum space 106 that is surrounded by the shallow convolution 82 on all sides thereof to maintain a predetermined pressurization of the plenum 106 to produce an air lift effect on the rigid support member 52. In operation, the pressurized air in the plenum 106 produces an air cushion substantially throughout the full planar extent of the base 24 of the refrigerator 10 throughout the irregularly-shaped extent of the base. The shallow convolution 82 is maintained at a predetermined height relationship with a supporting floor to define a control passageway 108 completely around the air cushion load supporting device 50 through which air escapes from the plenum 106 and, as a result, with a proper selection of the air supply to the device 50, the load represented by the refrigerator 10 will be raised a predetermined distance above its supporting floor so that the floor engaging legs 30, 32 and embossed portions 44, 46 of the cabinet will be separated from the floor so as to reduce frictional engagement from the base 24 and the supporting floor.

As a result, the refrigerator 10 is supported frictionlessly on the floor for ease of movement with respect to the floor. Furthermore, by virtue of the separation of the opposite portions of the shallow convolution 82 in the air cushion device 50, and the consequent distribution of an air cushion under substantially the full planar extent of the base 24 of the refrigerator 10, any tipping moments that are directed thereagainst are opposed by the air cushion so as to reduce the tendency of the air cushion device 50 to bottom out against the floor so as to destroy the friction reducing air cushion effect thereof. Furthermore, by virtue of the sharp radius segment 84 and transition segment 86 of the convolution 82, the convolution, depending upon the weight of the supported load, will be inwardly and outwardly adjusted to vary the planar extent of the air cushion beneath the rigid plate member 52 to increase the stability of the platform represented by the air cushion device 50.

While the embodiment of FIGURES 1 through 8 illustrates the diaphragm portion of the air cushion device 50 as having a generally rectangular, irregular form, in the embodiment of FIGURE 9 an irregularly-shaped air cushion device is illustrated of a triangular configuration including a rigid backing plate 112 like plate 52 and a depending diaphragm 114 including a continuously formed shallow convolution 116 underlying the outer peripheral edge of the plate 112. The convolution 116 includes an outer peripheral edge 118 suitably bonded to the backing plate 112 and a like formed inner peripheral edge 120. The convolution forms a cavity like 88 which is communicated with a suitable source of pressure by means (not shown) like the inlet fitting 90 and supply tube 94 in the first embodiment and the diaphragm 114 includes a plurality of small diameter openings 122 that communicate the pressurizable cavity with a plenum space bounded by the lower-most extremity of the convolution 116 as was the case in the first embodiment.

A still further illustration of the invention is illustrated in FIGURE 10 where an elongated, bent, irregularly-shaped backing plate 124 is illustrated that includes a depending shallow convoluted diaphragm 126 like that in the first embodiment which forms an air cushion that underlies substantially the full planar extent of the backing plate 124 by directing air through a plurality of small diameter openings 128 located adjacent a continuous inner peripheral edge 130 of a shape like that of the outer periphery of the member 124 into a plenum chamber formed by the diaphragm beneath the member 124. As in the previous examples, the diaphragm 126 includes an outer peripheral edge 132 thereon secured to the member 124 continuously about the outer periphery thereof.

While three embodiments of the invention have been illustrated, it will be appreciated that the concept of an irregularly-shaped diaphragm with a shallow convolution of the present invention is suited for incorporation in units having other like irregular shapes. In all cases the provision of a shallow convoluted diaphragm having an irregular peripheral form produces the desirable effect of reducing instability in low-profile air cushion load supporting devices of the type under consideration.

While the embodiments of the present invention as herein disclosed constitute preferred forms, it is to be understood that other forms might be adopted.

What is claimed is as follows:

1. In combination, a supported load having a center of gravity and a loading surface located above said center of gravity on which tipping moments are normally applied, said load having a base of irregular form, a rigid plate of irregular form underlying said base in supported relationship with said base, said plate being congruous with said base throughout substantially the full planar extent thereof, means for securing said rigid plate to said base, a flexible diaphragm depending from said rigid plate including an outer peripheral edge portion hermetically sealed to said rigid plate about the outer periphery thereof, said outer peripheral edge of said flexible diaphragm having substantially the same plan form as said load base, said diaphragm further including an inner peripheral edge portion thereon hermetically sealed to said rigid plate and having a plan form like that of said supported base, said inner peripheral edge being substantially uniformly spaced from said outer peripheral edge, a shallow convolution in said diaphragm joining said inner and outer peripheral edges and being spaced apart from said rigid plate to form an annular pressurizable chamber throughout the outer peripheral limits of said rigid plate, said convolution and said rigid plate defining a plenum chamber below said plate, means for supplying pressurized air to said annular pressurizable chamber, means including a plurality of openings in said diaphragm adjacent the inner peripheral edge thereof for communicating said pressurizable chamber with said plenum spaced bounded by said shallow convolution, said shallow convolution being located substantially totally within said outer peripheral edge when said chamber is pressurized, said above defined inner and outer peripheral edges holding said convolution against lateral movement with respect to said plate during eccentric loading of said plate, said convolution including an annular portion thereof located in close proximity to a supporting floor upon pressurization of said annular chamber for controlling air flow from said plenum chamber, said convolution having a uniform width throughout its length, the width of said convolution being less than one-third of the width of the base of the supported load.

2. In combination, a supported load having a center of gravity and a loading surface located above said center of gravity on which tipping moments are normally applied, said load having a base of irregular form, a rigid plate of irregular form underlying said base in supported relationship with said base, said plate being congruous with said base throughout substantially the full planar extent thereof, means for securing said rigid plate to said base, a flexible diaphragm depending from said rigid plate including an outer peripheral edge portion hermetically sealed to said rigid plate about the outer periphery thereof, said outer peripheral edge of said flexible diaphragm having substantially the same plan form as said load base, said diaphragm further including an inner peripheral edge portion thereon hermetically sealed to said rigid plate and having a plan form like that of said supported base, said inner peripheral edge being substantially uniformly spaced from said outer peripheral edge, a shallow convolution in said diaphragm poining said inner and outer peripheral edges and being spaced apart from said rigid plate to form an annular pressurizable chamber throughout the outer peripheral limits of said rigid plate, said convolution and said rigid plate defining a plenum chamber below said plate, means for supplying pressurized air to said annular pressurizable chamber, means including a plurality of openings in said diaphragm adjacent the inner peripheral edge thereof for communicating said pressurizable chamber with said plenum space bounded by said shallow convolution, said shallow convolution being located within said outer peripheral edge when said chamber is pressurized, said above defined inner and outer peripheral edges holding said convolution against lateral movement with respect to said plate during movement and eccentric loading of said plate, said convolution including an annular portion thereof located in close proximity to a supporting floor upon pressurization of said annular chamber for controlling air flow from said plenum chamber, said inner peripheral edge of said diaphragm bounding an air lift surface on said plate immediately above said plenum space extending substantially throughout the planar extent of said plenum space said convolution having a uniform width throughout its length, the width of said convolution being less than one-third of the width of the base of the supported load.

3. In combination, a supported load having a center of gravity and a loading surface located above said center of gravity on which tipping moments are normally applied, said load having a base of irregular form, a rigid plate of irregular form underlying said base in supported relationship with said base, said plate being congruous with said base throughout substantially the full planar extent thereof, means for securing said rigid plate to said base, a flexible diaphragm depending from said rigid plate including an outer peripheral edge portion hermetically sealed to said rigid plate about the outer periphery thereof, said outer peripheral edge of said flexible diaphragm having substantially the same plan form as said load base, said diaphragm further including an inner peripheral edge portion thereon hermetically sealed to said rigid plate and having a plan form like that of said supported base, said inner peripheral edge being substantially uniformly spaced from said outer peripheral edge, a shallow convolution in said diaphragm joining said inner and outer peripheral edges and being spaced apart from said rigid plate to form an annular pressurizable chamber throughout the outer peripheral limits of said rigid plate, said convolution and said rigid plate defining a plenum chamber below said plate, means for supplying pressurized air to said annular pressurizable chamber, means including a plurality of openings in said diaphragm adjacent the inner peripheral edge thereof for communicating said pressurizable chamber with said plenum space bounded by said shallow convolution, said shallow convolution being located within said outer peripheral edge when said chamber is pressurized, said above defined inner and outer peripheral edges holding said convolution against lateral movement with respect to said plate during movement and eccentric loading of plate, said convolution including an annular portion thereof located in close proximity to a supporting floor upon pressurization of said annular chamber for controlling air flow from said plenum chamber, said load having a base of rectangular form, said annular pressurizable cavity having a rectangular form, said shallow convolution on said diaphragm underlying the outer peripheral edge of the base, said convolution on said diaphragm maintaining an air control orifice around said base and an air lift throughout the planar extent thereof substantially to the outer peripheral edge thereof to minimuze tipping of said load, said convolution having a uniform width throughout its length, the width of said convolution being less than one-third of the width of the base of the supported load.

4. In combination, a supported load having a center of gravity and a loading surface located above said center of gravity on which tipping moments are normally applied, said load having a base of irregular form, a rigid plate of irregular form underlying said base in supported relationship with said base, said plate being congruous with said base throughout substantially the full planar extent thereof, means for securing said rigid plate to said base, a flexible diaphragm depending from said rigid plate including an outer peripheral edge portion hermetically sealed to said rigid plate about the outer periphery thereof, said outer peripheral edge of said flexible diaphragm having substantially the same plan form as said load base, said diaphragm further including an inner peripheral edge portion thereon hermetically sealed to said rigid plate and having a plan form like that of said supported base, said inner peripheral edge being substantially uniformly spaced from said outer peripheral edge, a shallow convolution in said diaphragm joining said inner and outer peripheral edges and being spaced apart from said rigid plate to form an annular pressurizable chamber throughout the outer peripheral limits of said rigid plate, said convolution and said rigid plate defining a plenum chamber below said plate, means for supplying pressurized air to said annular pressurizable chamber, means including a plurality of openings in said diaphragm adjacent the inner peripheral edge thereof for communicating said pressurizable chamber with said plenum space bounded by said shallow convolution, said shallow convolution being located within said outer peripheral edge when said chamber is pressurized, said above defined inner and outer peripheral edges holding said convolution against lateral movement with respect to said plate during movement and eccentric loading of said plate, said convolution including an annular portion thereof located in close proximity to a supporting floor upon pressurization of said annular chamber for controlling air flow from said plenum chamber, said inner peripheral edge of said diaphragm bounding an air lift surface on said plate immediately above said plenum space extending substantially throughout the planar extent of said plenum space, said air lift surface on said plate bounded by said inner peripheral edge having a width not less than the width of said pressurizable chamber formed by said shallow convolution joining said inner and outer peripheral edges of said diaphragm, said convolution having a uniform width throughout its length, the width of said convolution being less than one-third of the width of the base of the supported load.

5. In combination, a supported load having a center of gravity above which tipping moments are normally applied, air cushion means for supporting said load against undesirable tipping and for relatively frictionless movement with respect to a supporting floor, said air cushion means including a rigid plate of an irregular form with a planar extent congruous with the full planar extent of the base of said load, means for securing said rigid plate to the base of said load, a flexible diaphragm including a shallow convolution, said diaphragm including inner and outer peripheral edges for securing said convolution to said rigid plate around the outer periphery thereof for forming an air receiving plenum chamber underlying substantially the full planar extend of said rigid member and to define a pressurizable chamber between said diaphragm and said rigid plate, said shallow convolution having an inner surface portion formed as a truncated cone bounding said plenum chamber and an outer surface portion immediately underlying the outer periphery of said rigid plate throughout substantially the full planar extent thereof and located inside the outer periphery of said rigid plate when said pressurizable chamber is inflated, said surface portions being joined to define a depending perimetric boundary on said diaphragm coacting with a support surface to form a control opening for the escape of air from said plenum chamber, said inner and outer peripheral edges holding said convolution against lateral movement with respect to said plate during eccentric loading of said plate, said convolution having a uniform width throughout its length, the width of said convolution being less than one-third of the width of the base of the supported load.

References Cited

UNITED STATES PATENTS

| | | |
|---|---|---|
| 3,268,023 | 8/1966 | Di Napoli. |
| 3,276,222 | 10/1966 | Hutchinson. |
| 3,282,360 | 11/1966 | Amann et al. |
| 3,282,361 | 11/1966 | Mackie. |
| 3,313,367 | 4/1967 | Swedburg. |

A. HARRY LEVY, *Primary Examiner.*